Aug. 8, 1933.  H. R. CRECELIUS  1,921,284
AUTOMOBILE BODY CONSTRUCTION
Filed June 10, 1931   3 Sheets-Sheet 1
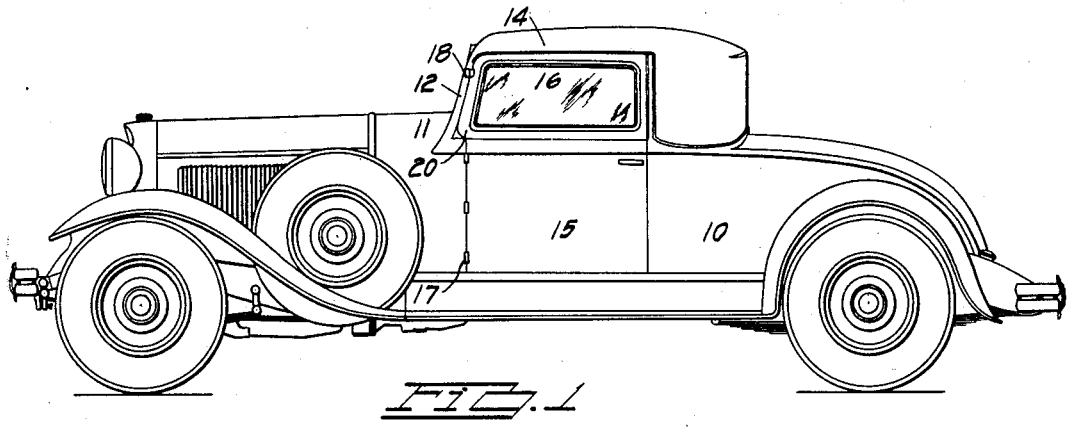
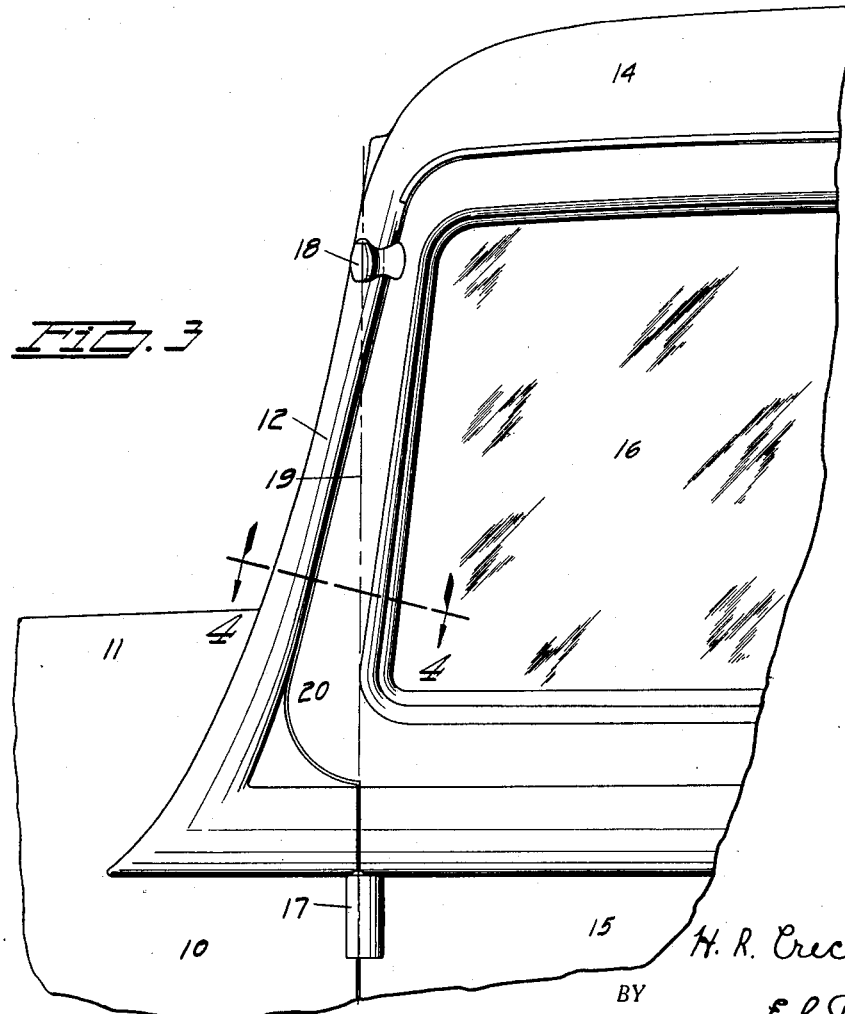
INVENTOR.
H. R. Crecelius
BY
ATTORNEY.

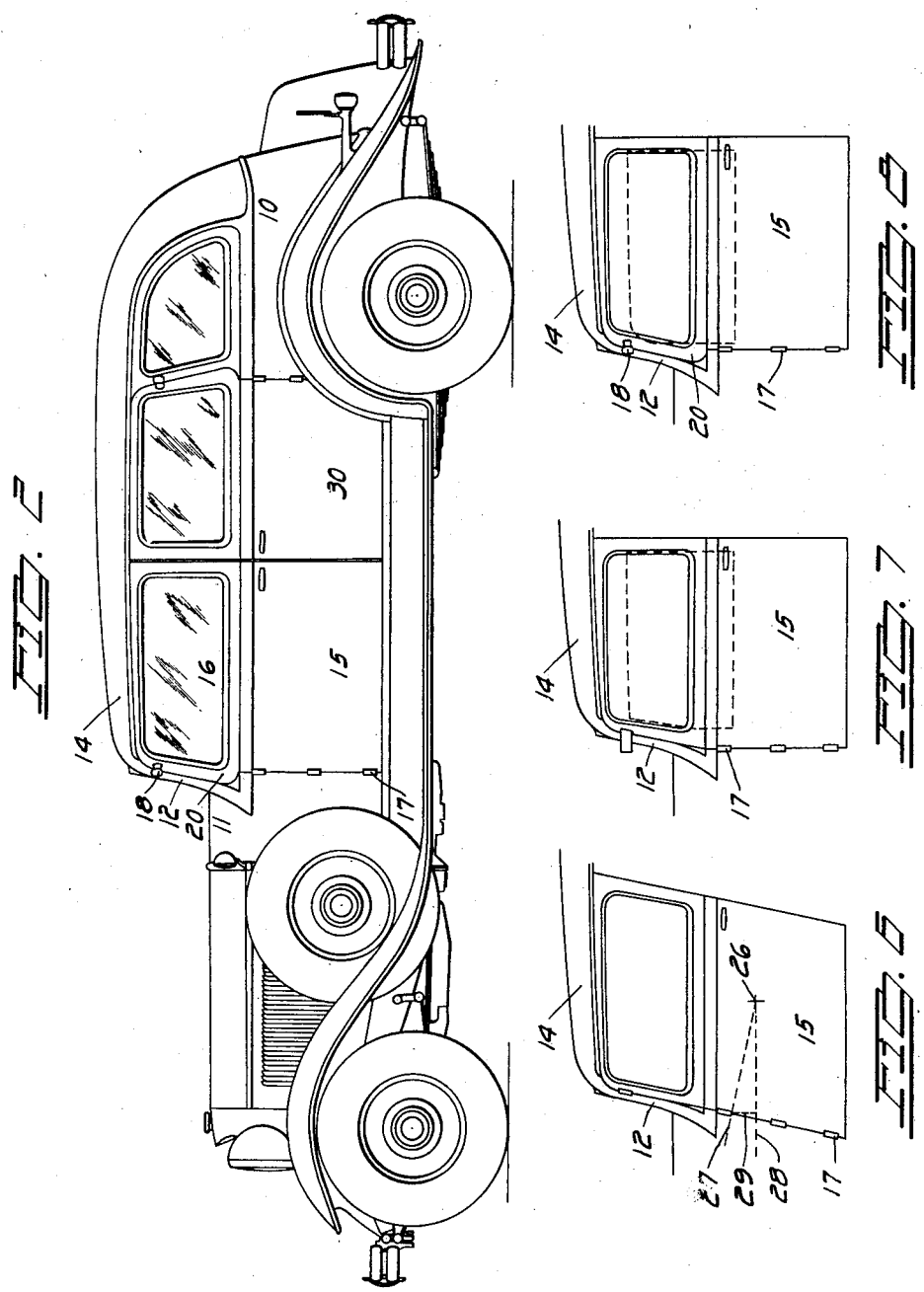

Aug. 8, 1933.  H. R. CRECELIUS  1,921,284
AUTOMOBILE BODY CONSTRUCTION
Filed June 10, 1931  3 Sheets-Sheet 3
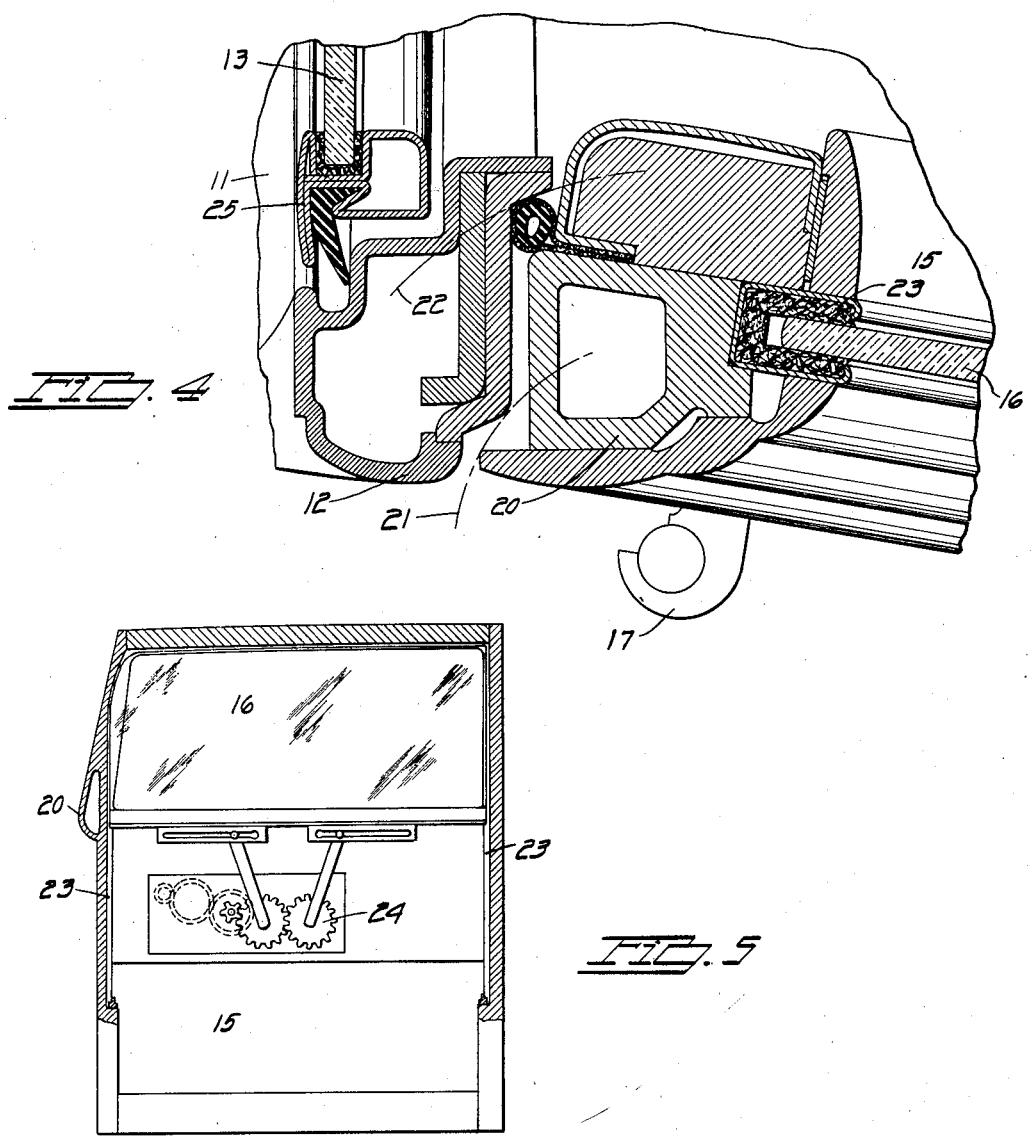
INVENTOR.
H. R. Crecelius.
BY
E. L. Davis
ATTORNEY.

Patented Aug. 8, 1933

1,921,284

UNITED STATES PATENT OFFICE 1,921,284

AUTOMOBILE BODY CONSTRUCTION

Henry R. Crecelius, Detroit, Mich., assignor to Ford Motor Company, Dearborn, Mich., a Corporation of Delaware Application June 10, 1931. Serial No. 543,409

4 Claims. (Cl. 296—28)

The object of my invention is to provide a streamline automobile body construction of the closed car type which will possess advantages heretofore unobtainable in this type of body. More specifically, my invention relates to automobile bodies having slanted windshields, that is, windshields tilted so that their upper edges are spaced a considerable distance rearwardly of the lower portions thereof. Such windshields are advantageous both from an appearance and an areodynamic standpoint. It is well known that air resistance is the major retarding force in the operation of cars at fairly high speeds and consequently, the trend in automobile design is to counteract such air resistance as much as possible without seriously injuring the appearance or appointments of the vehicle. The use of a slanting windshield for reducing the air resistance is advantageous as it deflects the air smoothly over the top of the car with much less turbulence than occurs with a vertical windshield for which reason the use of such slanting windshields is quite extensive at the present time. My improved construction combines the advantages of the slanted windshield with certain other advantages, to be more fully described later in this specification, which other advantages were heretofore unobtainable.

It is almost essential that the door pillars and other obstructions on automobile closed bodies, especially the windshield side posts, be as small in cross section as possible in order to provide the maximum of unobstructed vision for the driver of the car. For this reason, the hinge posts of the doors adjacent to the windshield must closely follow the lines of the windshield to thereby offer as small a cross section for the combined members as possible. This requirement has led to numerous difficulties in designing closed bodies having slanting windshields because the upper half of the door is adjacent to the windshield and must be slanted, while the lower half must remain vertical. The door hinges can be secured to only one portion of these posts, usually the lower half, inasmuch as the edge of the door is not straight from top to bottom. This construction leaves the upper portion of the door entirely unsupported and, as this portion consists of only a narrow glass frame, the vibration of the car frequently sets up rattles in this portion of the door which are very annoying and very difficult to eliminate. My invention eliminates this disadvantage by allowing the use of hinges along the full height of the door.

Still a further object of my invention is to provide a body construction having a door, as just described, in which the window glass is reciprocally mounted and in which both edges of the glass are supported substantially the full height of the glass. Formerly, when the hinge pillar of the door was slanted to correspond to a slanting windshield post, it was impossible to provide a glass run supporting both edges of the window glass therein, for the reason that the slanted edge of the glass pulled away from the glass run when the glass was lowered. With my improved construction, the glass is supported along both edges for substantially the full height thereof, this support being maintained even when the glass is in its lowest position whereby rattle and breakage of the glass is amply resisted.

With these and other objects in view my invention consists in the arrangement, construction and combination of the various parts of my improved device, as described in the specification, claimed in my claims, and illustrated in the accompanying drawings, in which:

Figure 1 shows a side elevation of a coupé type body having my improved construction incorporated therein.

Figure 2 shows a side elevation of a sedan type body having the construction also incorporated therein.

Figure 3 shows an enlarged side view of the windshield post, shown on the bodies illustrated in Figures 1 and 2.

Figure 4 shows a sectional view, taken on the line 4—4 of Figure 3.

Figure 5 shows a diagrammatic view illustrating the window glass and regulating mechanism, showing the full glass runs whereby the glass is supported on both edges substantially the full height thereof.

Figure 6 is a diagrammatic view, illustrating one manner of mounting a vehicle door disposed adjacent to a slanted windshield.

Figure 7 is a diagrammatic view, illustrating still another method of mounting a vehicle door adjacent to such a windshield, and Figure 8 is a diagrammatic view, illustrating the applicant's structure for mounting such vehicle door; the Figures 6 and 7 being shown to more clearly distinguish the advantages of the applicant's structure over the prior constructions.

Referring to the accompanying drawings, I have used the reference numeral 10 to indicate generally an automobile body of the coupé type having a cowl portion 11 associated therewith.

A pair of windshield posts 12 extend upwardly and rearwardly in a diagonal direction from each side of the cowl and a windshield 13 is mounted between these two posts, the windshield glass being held in a conventional frame member 25. The upper ends of the posts 12 are permanently secured to the roof 14 of the vehicle and the forward edge of the roof is rounded so that reduced air resistance results with this body by allowing a smooth and relatively unrestricted flow of air from the windshield up and over the roof 14.

I have provided a rectangular shaped door opening in each side of the car body and it will be noted that these openings are spaced rearwardly a considerable distance from the lower ends of the windshield posts. In fact, the forward edges of these openings are substantially in line with the upper ends of the windshield posts. Doors 15 form the closures for these openings, the lower portions of which are solid and the upper portions of which are provided with windows 16 reciprocally mounted therein to be raised and lowered in and out of the solid portions of the doors. It will be noted that the openings for these doors are not exactly rectangular but that the forward edge of each opening only extends vertically from the body sill up to position level with the top of the cowl, the section above the cowl being offset forwardly so as to follow the slanted lines of the windshield posts. For this reason, the doors are provided with a plurality of hinges 17 fastened to the lower half of each door and to the adjacent portion of the body. Directly in line with and above the hinges 17, I have provided still another hinge 18 which secures the upper corner of the door with the upper end of the adjacent windshield post. It is, of course, necessary that the hinges 17 and 18 be in alignment and that their pivot line extends in a vertical direction, as otherwise the door will not swing porperly. The forward edge of the door is constructed around a door pillar which extends the full height thereof, which door pillar is, of course, offset, as shown by numeral 20.

Referring to Figure 3, the pivot line upon which the door swings is shown by the dotted line 19 and it will further be noted that due to the lower portion of the windshield post 12 being spaced forwardly from the door opening, the forward door pillar must be offset forwardly as otherwise a gap would be inevitable between the door and the lower portion of the windshield post. I have thus provided such an offset portion 20 formed integrally with the forward edge of the door. Two very important results are obtained by this provision, the one being that the joint between the door and the adjacent windshield post follows the general slanting direction of the windshield to thereby carry out the streamline appearance of the vehicle, and the other being that the cross section of the post and door pillar is correspondingly reduced so that relatively clear and unobstructed vision results. It may be well to mention herein that the total thickness of my door pillar and windshield post need be no greater than that required for structural strength alone.

At a glance it may not be apparent that such a door will swing clear of the body nevertheless, referring to Figure 4, it will be seen that the forward edge of the offset portion 20 swings around the hinges 17 when the door is opened in a path, shown by dotted lines 21, and that the inner portion of the door swings in a path, shown by dotted lines 22. Thus, clearance is obtained for this offset portion so that the door will open without binding.

Referring to Figure 5, the interior of my door structure and reciprocating window 16 are shown. The means for guiding the window consist of a pair of channel shaped runs 23 secured to the interior edge of each of the door pillars, the rear run extending the full height of the door from the lower part to the upper edge thereof, while the forward glass runs extend from the lower part of the door up to position spaced only a short distance from the upper edge thereof. These two glass runs are parallel whereby practically the full length of both edges of the glass are supported therein whereby the glass may be amply supported while being raised and lowered by a suitable window regulating mechanism 24. It will also be noted from this view that the forward glass run extends vertically through the slanting offset portion 20, whereby the slanted appearance of the members is maintained.

Figure 6 shows one method of mounting a door on a vehicle having a slanting windshield. In this construction the door is formed in the shape of a parallelogram with the hinge line extending in a diagonal direction parallel to the adjacent windshield post. Inasmuch as both door pillars in such device are parallel, the window glass may be readily made to reciprocate between two diagonal but parallel runways so that in this respect the device is suitable for amply supporting both edges of the glass. However, the inherent disadvantage of this structure and the reason that it does not solve the problems encountered in connection with bodies having slanting windshields, is that the door is not in balance, that is, it will not stay open but will tend to slam shut unless some elaborate counterbalancing scheme is provided. It will readily be seen that the center of gravity of this door, which is shown at 26, must be swung diagonally upwardly along a line 27 perpendicular to the hinge line of the door when the latter is opened. Thus, when the door is opened 90 degrees the center of gravity has been raised a considerable height above its normal plane which is shown by the dotted line 28, the amount of this raise being designated by the dotted line 29. It will consequently be seen that when the door is open the weight thereof represented by the center of gravity 26 will tend to swing along the line 27 and slam the door shut, usually with such violence that a person's fingers if caught therebetween would be seriously injured. This defect is inherent with this type of slanted hinge line and is increased by increasing the slant of the hinge line. For this reason a vertical hinge line is imperative so that this door will open easily and remain open in any of its positions until manually closed.

Referring to Figure 7 still another form of body is shown wherein a slanted windshield is incorporated. It will be noted from this view that the hinge line extends in a vertical direction and that it intersects the windshield post at its lower end. An offset hinge must be provided between the upper part of the door and the upper end of the windshield post so that the upper portion of the door may be supported. Due to the long arms of such hinges, which are necessary to reach from the door to the vertical hinge line, rattle between the door and post develops much sooner than with the short hinge of the applicant's device. Still further such an offset hinge mars the streamline appearance of the body.

Referring now to Figure 8, my improved construction is shown diagrammatically, from which it will be seen that I have provided a slanting joint between the forward edge of the door and the windshield post to carry out the streamline appearance of the car; that I have provided a vertical hinge line between the door and the body so that the door will swing correctly; that further, I have provided a hinge between the upper portion of the door and the windshield post which although inconspicious rigidly supports the upper portion of the door; and that still further, I have provided a window glass which may be raised or lowered and which is provided with supporting glass runs extending substantially the full length of each side thereof.

Referring to Figure 2, a sedan type body is shown having my improved door construction incorporated therein, the slanted streamline appearance of the windshield being carried out in the design of the rear doors 30 of the car. It will be seen that the rear edge of the door 30 is offset similar to the forward edge of the door 15 so that the window openings are substantially the same shape whereby the streamline appearance of the car is enhanced. Although a rectangular shaped door would no doubt serve the purpose equally as well and be of equal strength; still when a slanted type windshield is used, it may be found desirable from an appearance standpoint to provide a similar rear door to carry out this streamline appearance.

Many advantages are derived from the use of my improved device among which it may be well to mention that I have provided an automobile body having a slanted windshield and at the same time have provided narrow windshield posts and door pillars so that the vision of the driver is not excessively obstructed. Further, my door construction is provided with a vertical hinge line so the door will open properly, nevertheless the joint between the door and the windshield hinge post extends in a slanted direction to carry out the streamline appearance of the body. Still further, I have provided a hinge supporting the upper portion of the door which does not project forwardly of the windshield post to thereby effectively prevent rattle and vibration between the door and body.

Some changes may be made in the arrangement, construction and combination of the various parts of my improved device without departing from the spirit of my invention, and it is my intention to cover by my claims such changes as may reasonably be included within the scope thereof.

I claim as my invention:

1. In an automobile body having a rigid top non-detachably associated therewith and having a door opening in one side thereof extending substantially the full height of said body, an upwardly and rearwardly slanting windshield post associated with said body, said post forming the upper portion of the forward edge of said door opening and having its lower end spaced a substantial distance forwardly from the lower portion of said forward edge, a door extending substantially the full height of said door opening and forming a closure therefor, said door being characterized by having its forward edge built around a continuous door pillar which is forwardly offset intermediate of its ends so as to be complementary to the forward edge of said door opening, a plurality of aligned hinges securing the lower portion of said door to the adjacent edge of the door opening and securing the upper portion of the door to the adjacent portion of the windshield post, said door having a window opening therein, said pillar being of sufficient size that it will possess the structural strength to pivotally support said door over its full height, while still not materially obstructing the driver's vision, and a reciprocable window glass mounted within the lower portion of said door so as to be operatively raised to close said window opening.

2. A device, as claimed in claim 1, wherein said door hinge line extends in a truly vertical direction.

3. A device, as claimed in claim 1, wherein said door pillar is formed as a single metal casting which extends the full height of said door.

4. A device, as claimed in claim 1, wherein said window opening is formed with its lower forward corner extending into said offset portion so as to be substantially horizontally aligned with the door hinge line and vertically aligned with the offset portion, whereby the door pillar is not materially structurally weakened for the purpose described.

HENRY R. CRECELIUS.